United States Patent [19]

Pedi

[11] 3,736,829
[45] June 5, 1973

[54] SLICER HAVING AUTOMATIC MATERIALS FEED

[76] Inventor: Mario J. Pedi, 16 Wickham Road, Winchester, Mass. 01890

[22] Filed: Sept. 10, 1971

[21] Appl. No.: 179,464

[52] U.S. Cl. .................... 83/788, 214/8.5 F, 83/703
[51] Int. Cl. ............................................... B26d 1/00
[58] Field of Search .................... 83/201, 406.1, 788, 83/703; 214/8.5 R, 8.5 F; 146/81 R, 102.7, 102 G; 143/25 R

[56] References Cited

UNITED STATES PATENTS

| | | | |
|---|---|---|---|
| 3,485,125 | 12/1969 | Chase | 83/201 |
| 3,311,007 | 3/1967 | McGee | 83/201 X |
| 2,855,009 | 10/1958 | McCormick | 83/201 |
| 2,739,646 | 3/1956 | Burns et al. | 83/201 |
| 2,699,862 | 1/1955 | Walter | 214/8.5 F X |
| 1,886,321 | 11/1932 | Walker | 143/25 R |

Primary Examiner—Andrew R. Juhasz
Assistant Examiner—W. D. Bray
Attorney—W. Hugo Liepmann

[57] ABSTRACT

Apparatus for feeding pieces of material to a cutting tool which sequentially cuts slices from each piece of the material stores block-like pieces of the material in a stack from which a single piece is discharged to be sliced, displaces the uncut portion of a piece to the side away from the cutting tool after completion of each slicing advance thereby to retract the uncut portion past the tool without interference, engages the residual portion of the piece which is too thin to be again sliced to control its removal from the machine, and separates the residual piece from the last slice cut from it without damage to the slice.

14 Claims, 9 Drawing Figures

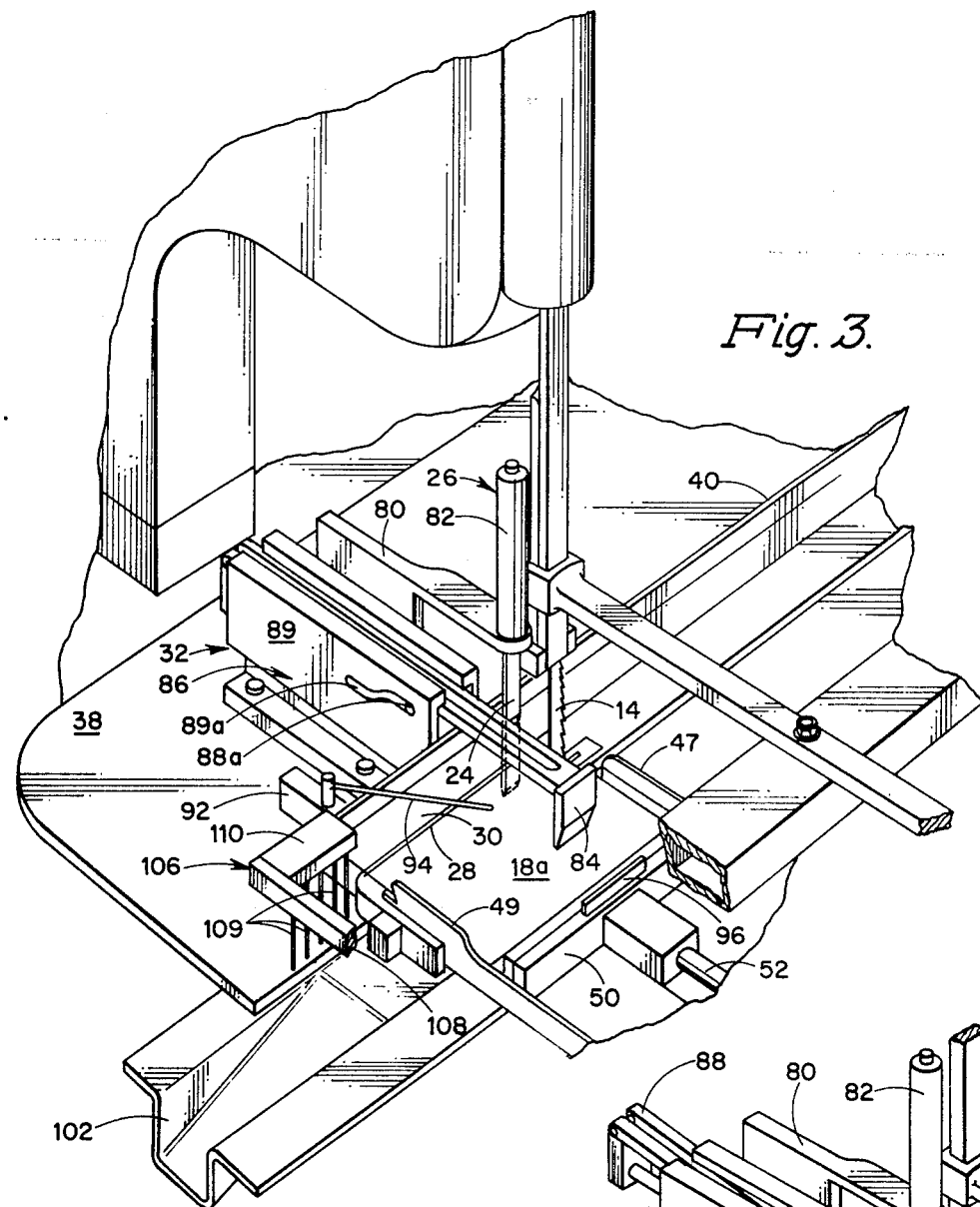
Fig. 3.
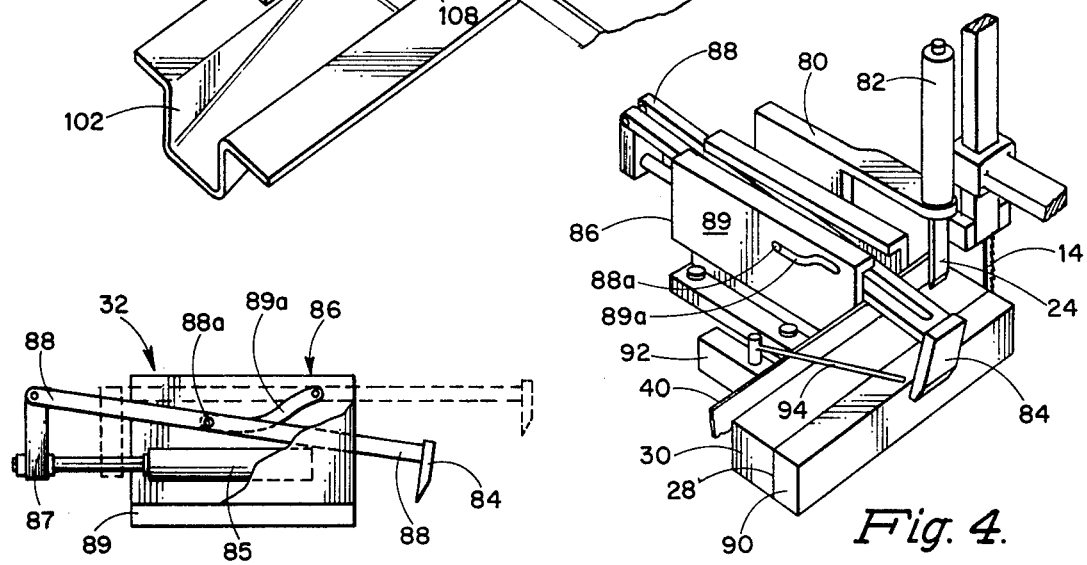
Fig. 4.
Fig. 5.

SLICER HAVING AUTOMATIC MATERIALS FEED

BACKGROUND

This invention relates to an automatic mechanism for feeding a piece of material to a cutting tool which repeatedly cuts a slice from the piece. In particular, the invention provides such a feed mechanism that positions and moves the initial piece and the uncut portion of the piece in a manner that facilitates the automatic cutting of successive slices from each piece, the automatic removal of the residue of the piece, and the automatic introduction of successive pieces to be sliced.

The invention finds use, by way of illustrative example, in equipment for slicing foodstuffs and in particular for cutting blocks of frozen fish into slices. Accordingly, the invention will be described with reference to an embodiment of this kind, although features of the invention can be used to advantage in equipment for slicing other materials.

As illustrated for example by U. S. Pat. No. 1,427,661, it is known to provide a meat-slicing band saw with a reciprocating meat-carrying tray and with a stationary rail against which the meat is slid for metering the thickness of the meat slices. Further, U. S. Pat. Nos. 1,643,829; 1,793,461; and 1,959,184 disclose different constructions for meat cutters which are broadly of the present type and which appear to be concerned with the problem of preventing the meat which is being cut from interferingly engaging with the saw blade when the carriage carrying the meat is retracted back past the blade to the initial position from which the cutting of another slice is started. One prior machine avoids the problem by retracting both the cut slice and the uncut meat together. The other constructions of these patents have the tray or platform on which the meat rests movable to separate the cut slices from the uncut meat. The construction of platforms for this motion, together with the advance-retract motion which carries the meat by the saw blade for the cutting operation, is relatively complex and hence is generally costly and of limited reliability. U.S. Pat. Nos. 1,803,489; 2,081,033; 2,807,291; and 3,240,244 also disclose slicing machines but do not appear to contribute to the solution of this problem. Further, the handling of material such as frozen fish and the like is different from the handling of thawed meat due to the different physical properties of the different materials.

Accordingly it is an object of this invention to provide a mechanism for feeding block-like pieces of material automatically to a slicing cutter repeatedly for the sequential slicing of each piece.

Another object of the invention is to provide a feed mechanism of the above character which advances and then retracts the material being cut relative to the cutter, for the sequential slicing of the material, and which has an improved mechanism which selectively repositions the uncut portion of the piece after the cutting advance for unencumbered retraction of the block past the blade.

Another object of the invention is to provide slicing equipment which automatically feeds successive pieces of material to a slicing cutter repeatedly for the automatic sequential cutting of full-thickness slices from each piece.

A further object of the invention is to provide slicing equipment of the above character which automatically removes from the feed mechanism thereof the uncut residue of each piece of material when the thickness thereof is below a selected value, and in particular is too thin to allow the cutting of a full thickness slice therefrom.

Still another object of the invention is to provide slicing and feed apparatus of the above character for operation with block-like pieces of material and, in particular, for operation with block-like pieces of a material such as frozen fish.

Other objects of the invention will in part be obvious and will in part appear hereinafter.

SUMMARY OF THE INVENTION

A slicer according to the invention, and which feeds blocks of material in serial succession to a cutting tool which sequentially cuts slices from each block, has a store of stacked blocks and discharges single blocks from the store for feeding to the cutting tool. A transport advances a block discharged from the store into and through engagement with the cutting tool to cut a slice from it. A wedge is then interposed into the cut just made to open the cut by moving the uncut portion of the block laterally away from the slice just cut. The transport then retracts the laterally displaced block, preparatory to the cutting of another slice, with the cutting tool passing backward into and through the widened cut without interfering engagement with the uncut portion of the block. Further, a restraining mechanism engages the residual portion of the block when it is too thin to cut another full thickness slice from it. The restraining mechanism holds the residue of the block so that the transport retracts without it. This facilitates removal of the residue of each block and enables the transport automatically to pick up another block discharged from the store for automatic feeding to the cutting tool. As the residue and the last slice cut from it are discharged from the machine, the slice engages a separator that separates, with a resilient wedging action, the residual portion from it.

The invention accordingly comprises the features of construction, combinations of elements, and arrangement of parts exemplified in the construction hereinafter set forth, and further comprises the several steps and the relation of one or more of such steps with respect to each of the others according to which the apparatus functions, and the scope of the invention is indicated in the claims.

BRIEF DESCRIPTION OF DRAWINGS

For a fuller understanding of the nature and objects of the invention, a reference should be made to the following detailed description and the accompanying drawings, in which:

FIG. 3 is a fragmentary perspective view of the machine of FIG. 1 taken from another angle and showing elements adjacent the final position of the block transport;

FIG. 4 is a detail of FIG. 3 illustrating operation of the block-residue restraining mechanism;

FIG. 5 is a side elevation view, partly broken away, of the restraining mechanism actuator for the machine of FIG. 1;

DESCRIPTION OF ILLUSTRATED EMBODIMENT

Figure 1:
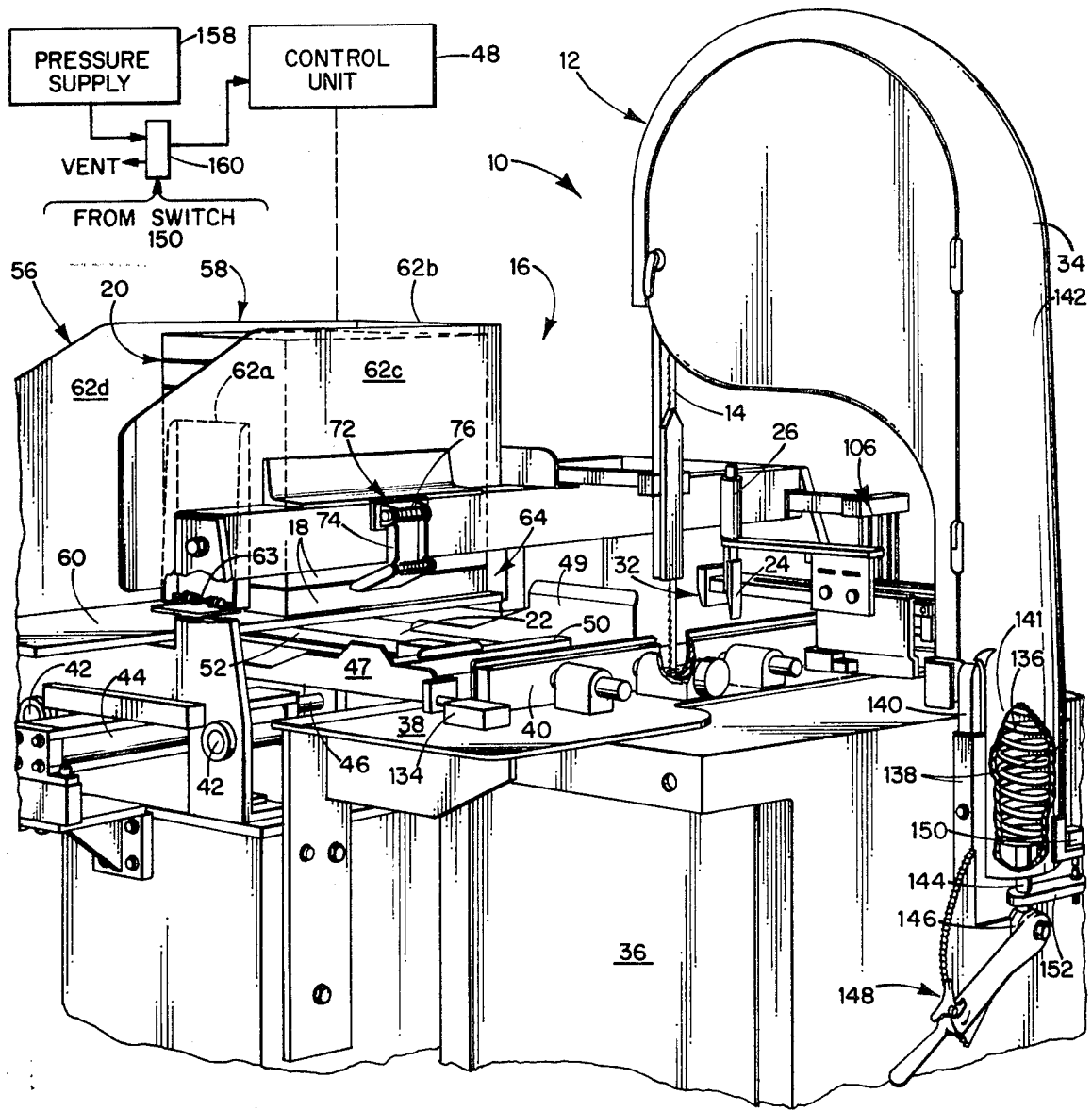
FIG. 1 is an over-all perspective view of a slicing machine embodying features of the invention.
Figure 2:
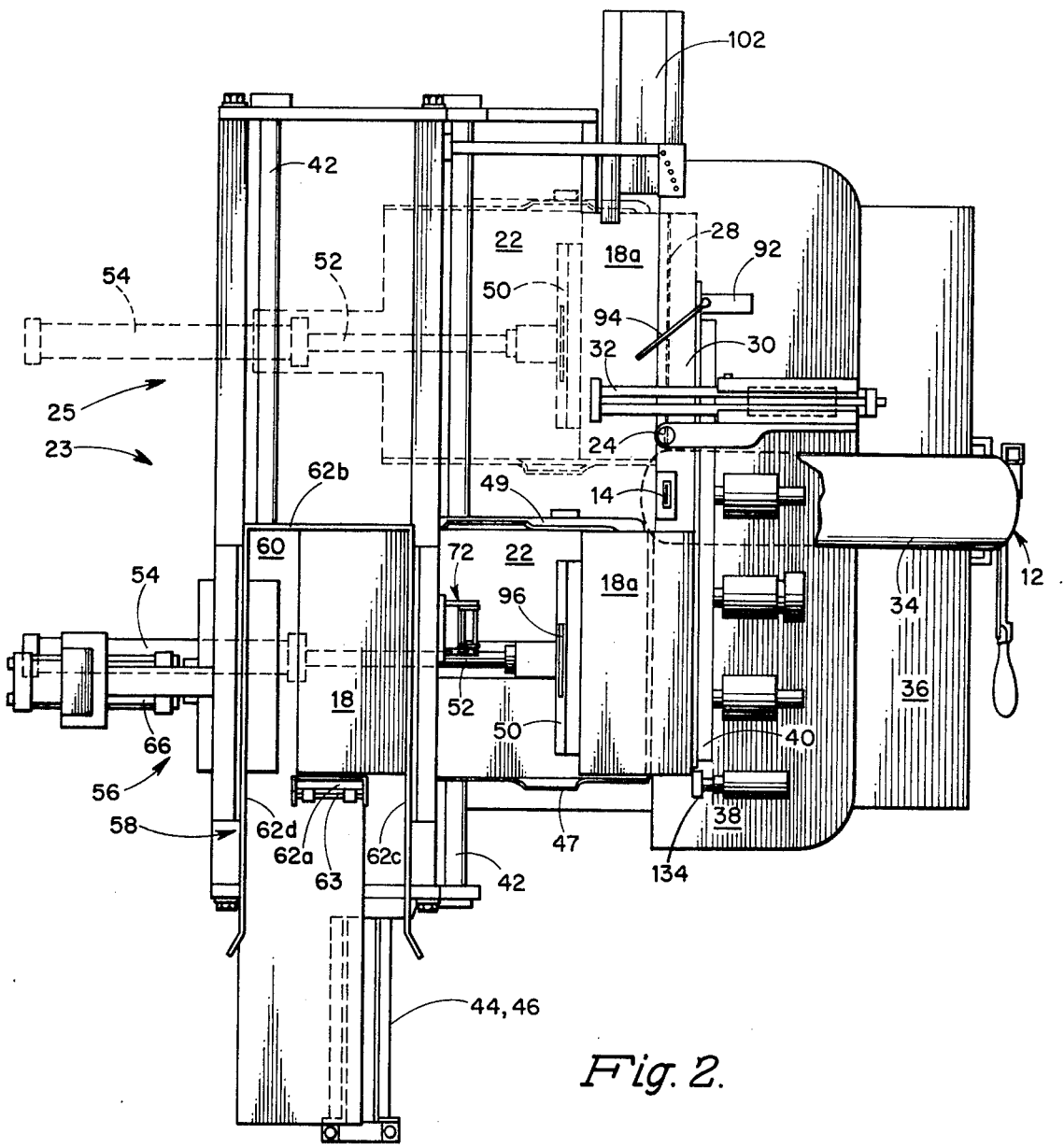
FIG. 2 is a top plan view of the machine of FIG. 1 showing both initial and final positions of the block transport.

FIGS. 1 and 2 show an automatic slicer 10 in accordance with the invention and having a band saw 12 with a blade 14, typically conventional, fitted with a feed mechanism 16. The mechanism discharges blocks 18, illustratively of frozen food such as frozen fish, individually from a stack 20 to a table 22. The feed mechanism repeatedly reciprocates the table with the block carried on it back and forth relative to the blade 14 to cut slices from the block. As shown in FIG. 2, this reciprocating movement carries the table 22 between an initial position 23, shown with solid lines, and a final position 25, shown with dashed lines.

An actuator 26 mounts a wedge 24 and interposes the wedge into the cut 28 between the block and the last slice 30 cut from it. The actuator provides this operation each time the table 22 has advanced to the final position, carrying the block through a cutting engagement with the blade, and prior to commencing the return to the initial position. The wedge shifts the uncut portion 18a of the block sideways away from the saw blade so that the block portion passes by the blade back to the initial position without interferingly engaging it.

As also shown in FIGS. 1 and 2, the slicer 10 has a restraining mechanism 32 that automatically restrains the uncut portion of a block, when it is too thin to cut another slice from it, at the final position 25. This ensures that the scrap portion of the block is removed from the reciprocating table 22 prior to the loading of a fresh block 18 onto the table for feeding to the saw. Operation of the restraining mechanism 32 inhibits the actuator 26 from projecting the wedge 24 between the scrap portion of the block and the last slice cut from it.

More particularly, as further shown in FIGS. 1 and 2, the slicer 10 has a base 36 which mounts a frame 34 for carrying the band-saw blade 14. The base 36, which also carries the feed mechanism 16, supports the reciprocating table 22 on one side of the saw blade 14 and a fixed table 38 on the other side of the blade. The tables 22 and 38 are horizontal and coplanar, and the section of the saw blade passing between them is vertical, with the cutting edge facing along the direction in which the table 22 reciprocates. A guide fence 40 is mounted on the fixed table 38 extending in the horizontal direction and along the side of the reciprocating table 22 throughout the length of its reciprocating travel. The fence is mounted in a conventional manner to adjust the spacing between it and the saw blade; the block 18 being cut is slid along the fence, and hence this spacing between the blade and fence is the thickness of the slice being cut.

The base 36 carries two horizontal guide bars 42,42 to which the reciprocating table 22 is slidably mounted for movement between the initial position 23 and the final position 25. The reciprocating drive for the table is a pneumatic cylinder 44 mounted on the base 36 and fitted with a piston 46 affixed to the table 22, as shown in FIG. 1. A control unit 48 is connected with the slicer 10 to control the cylinder 44 projection, and alternatively retraction, of the piston 46, and thereby control the reciprocating movement of the table 22.

The table 22 carries two walls 47 and 49 adjustably spaced apart along the direction of the table movement to seat the block being cut between them. The walls 47 and 49 thus ensure that the block being cut moves with the reciprocating table, and remains properly oriented relative to the saw blade.

A block 18a being cut is held against the guide fence 40 by a clamping jaw 50 which is at the end of a piston 52 projecting from a pneumatic cylinder 54 affixed to the reciprocating table 22. The fence 40 thus serves as a clamping member for the clock being cut. As shown in FIG. 2, the block-clamping cylinder 54 and piston 52 and the jaw 50 reciprocate with the table 22. The cylinder 54, operating with the control unit 48, projects the piston 52 toward the fence to clamp the block as shown in FIG. 2 and alternatively retracts the piston to release the residue of the block and for receiving a fresh block as shown in FIG. 5.

During each slice-cutting operation, when the table 22 advances from the initial position to the final position, the control unit 48 controls the cylinder 54 to project the piston toward the fence 40, thereby maintaining the block being cut butted against the fence as each slice is cut from it. However, during each retraction of the table with a block on it back to the initial position, the block 18a being cut is displaced away from the fence due to the action of the wedge 24 and the control of the cylinder 54.

More specifically, at the start of the advance of table 22 from the initial position to the final position, the control unit 48 and cylinder 54 drive the piston 52 outward to press the block 18a being cut firmly against the guide fence 40. Thereafter, as the table 22 travels to the final position, the pressure in the cylinder 54 gradually decreases. However, the cylinder 54 pressure does not reach zero prior to the table 22 reaching the final position, so that the piston 52 continuously urges the block 18a against the fence throughout the cutting of each slice. At this juncture, i.e., with the table 22 in the final position, the wedge 24 is actuated and displaces the block 18a away from the slice just cut and hence away from the fence, see FIG. 3. The cylinder 54 offers no significant opposition to this motion, allowing the piston 52 to telescope into it. Hence, the wedge 24 does not deform the block 18a. Further, after retraction of the wedge out of the saw cut, the block 18a remains displaced away from the fence as the table is retracted to its initial position.

Figure 1A:
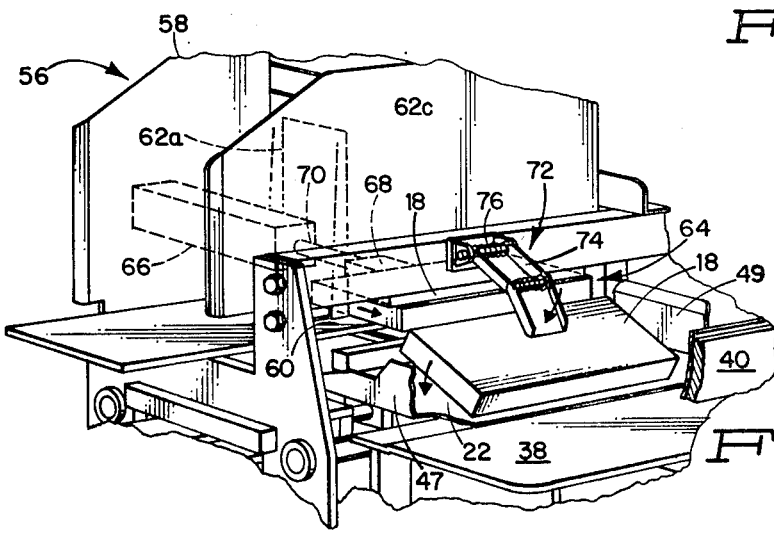
FIG. 1A is an enlarged detail of a portion of FIG. 1 showing the block-discharging operation of the slicing machine.

The feed mechanism 16 stores blocks 18 and discharges them one at a time to the reciprocating table 22 by means of a store and discharge mechanism 56 mounted on the base 36 above the table 22. As shown in FIGS. 1, 1A, and 2, this mechanism 56 stores the stack 20 of blocks in a box-like enclosure 58 having a horizontal bottom platform 60 parallel to and spaced above the table 22 and from which adjustably positioned stack-enclosing walls 62 extend upwardly. To facilitate loading the blocks into the mechanism 56, the walls 62 can be flared outwardly in the upward direction to form a guide chute or, alternatively, can have one or more walls such as the sidewall 62a spring loaded to urge the blocks resiliently against the opposing sidewall 62b. For this purpose, a spring-loaded hinge 63 mounts the sidewall 62a to the platform 60 and urges the wall against the stacked blocks, but allows it to be swung down to load more blocks into the enclosure 58.

To discharge the lowermost block from the stack 20 on the platform 60, the front enclosure wall 62c has a window 64 through which the block can be pushed off the platform, to discharge it onto the table 22. To effect the discharge, a pneumatic cylinder 66 extends a pusher jaw 68, on the free end of a piston 70 seated in the cylinder 66, through a further window in the back enclosure wall 62d. The pusher jaw 68 also serves to hold the blocks which are in the stack 20 above the block being discharged from descending until the latter block is fully discharged and the jaw 68 is retracted back from the platform.

As also shown in FIG. 1, the store and discharge mechanism 56 includes a block guide 72 in the form of an angled arm 74 suspended from the enclosure wall 62c with a spring-loaded hinge 76 that resiliently urges the arm downward, toward the wall 62c window. The normal position of the arm, when a block is not being discharged, is as shown in FIG. 1. Here the lower free end of the arm is at the window 64 and, due to the spring hinge and weight of the arm, bears against the bottom block in the stack 20 with a slight force which urges the block to remain in the stack. When the cylinder 66 and piston 70 discharge a block out of the stack, the block pushes against the arm 74, raising it to the position shown in FIG. 1A. As the leading edge of the block being discharged presses the arm upward further and the block begins to leave the stack, the downward force of the arm tips the leading edge of the block downward. This action, coupled with the further discharging of the block by the discharging piston and cylinder, quickly deposits the block on the reciprocating table 22 between the table walls 47 and 49. Note that the block is unsupported from below during its descent from the platform 60 to the table 22. Also, the table walls preferably flare apart at their upper ends as shown to facilitate the discharge of a block into a seating engagement between them. The clamping jaw 50 is retracted during this block-discharging operation; thereafter it is extended across the table 22, pushing the block just discharged against the fence 40.

FIGS. 3 and 4 show details of the wedge 24 and the wedge actuator 26. A bracket 80 mounts the illustrated actuator, which is a further pneumatic solenoid 82 having a piston and cylinder, from the fixed table 38 a short distance beyond the edge of the saw blade 14 opposite to the cutting edge, as indicated. The bracket 80 disposes the solenoid above the height of the blocks being sliced and with the movement of the solenoid piston being aligned above the cut which the band saw 12 makes in slicing a block 18a.

Figure 7:
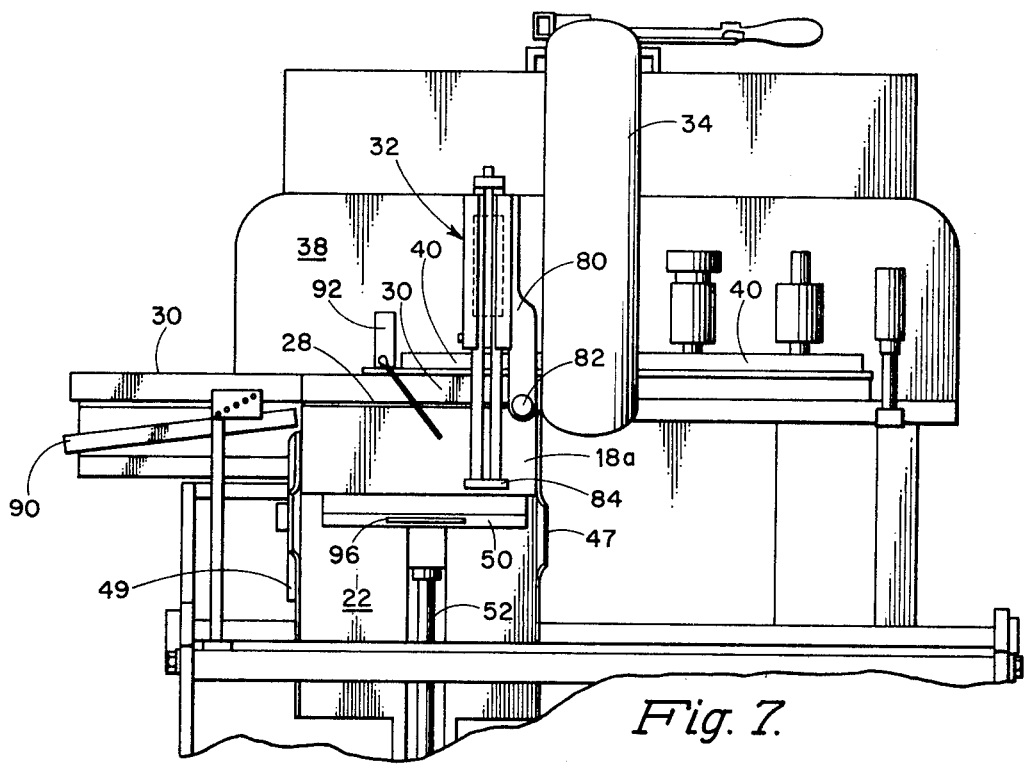
FIGS. 6 and 7 are top plan views of the machine of FIG. 1 showing successive stages in the operation.

The wedge 24 projects below the free end of the solenoid piston with an apex at the bottommost end and has increasing thickness along the height thereof upward from the apex. FIG. 4 shows the position of the wedge 24 when the solenoid 82 is retracted; the wedge is above the material being cut and does not affect the operation of the slicer. However, as shown in FIGS. 3 and 7, when the solenoid 82 projects the wedge downward, as occurs at the end of the advancing movement of the reciprocating table 22 to the final position 25, the wedge enters the saw cut just made. The slice 30 just cut is against the guide fence 40, and hence is constrained from movement, whereas the uncut block portion 18a is against the clamp jaw 50. Accordingly, the wedging action of interposing the wedge 24 into the saw cut displaces the uncut block portion away from the guide fence 40, which causes the piston 52 to be pushed slightly backward into the cylinder 54. The net result of projecting the wedge 24 into the saw cut is thus to displace the block portion 18a sideways away from the saw blade and thereby to widen the saw cut.

As described above, in the illustrated slicer the cylinder 54 is fully vented at this time and hence does not resist the return of the piston 52 by the wedge. Hence the solenoid 82 can retract the wedge 24 immediately after projecting it, all while the table 22 is in the final position. Thereafter, when the control unit 48 retracts the table, the block 18a is offset to the side away from the saw blade 14, and hence passes by it with a clearance space that ensures against an interfering engagement between the block and blade.

In this manner, the feed mechanism 16 is able repeatedly to feed a block 18 of frozen fish and other like material past and slightly beyond the saw blade 14 to fully sever a slice from the block, and then to retract the block back past the saw blade without the uncut portion of the block interferingly engaging the continuously moving saw blade. Such interfering engagement tends to abrade the edge of the block 18 along the cut just made, which generally wastes a significant portion of the block, particularly when thin slices are being cut from it. It also damages the segment of the block that is to be sliced from it next, as well as tending to unseat the saw blade from the pulleys on which it is trained. The seating of the block 18a between the walls 47 and 49 constrains it from significant cocking or skewing when the wedge 24 is interposed in the saw cut. As already noted, the wedge 24 is not projected after the cutting of the last slice from a block, i.e., when the residue of the block is too thin to cut another slice from it. Instead, the restraining mechanism 32, which will now be described, is called into operation.

Figure 6:
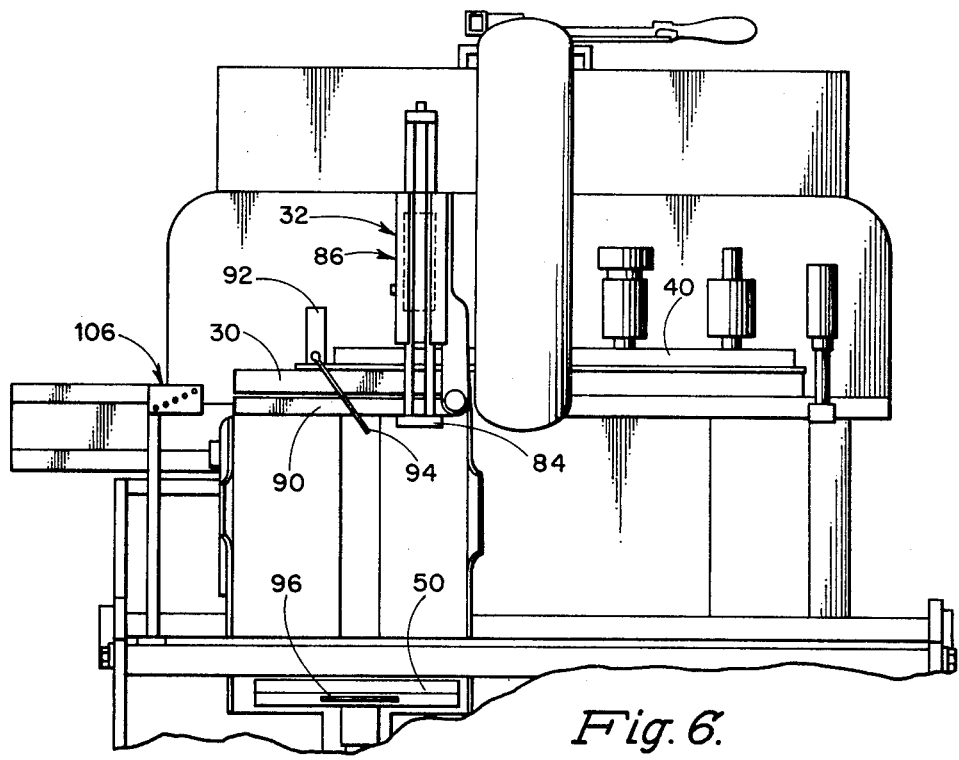

With reference to FIGS. 3–7, the illustrated restraining mechanism 32 for the residue 90 of a block 18a includes a jaw 84 carried on an actuator 86. To restrain the block residue from retraction to the initial position 23 with the table 22, the actuator 86 draws the jaw toward the fence 40, thereby clamping the slice just cut and the block residue against the fence at the furthest point to which the reciprocating table advances a block 18. FIGS. 4 and 6 show this condition of the mechanism 32, with the actuator retracting the jaw toward the fence 40; and FIGS. 3 and 7 show the other non-restraining, condition of the mechanism where the actuator 86 is extended.

As shown in FIG. 5, the illustrated actuator 86 has a pneumatic solenoid 85 with a linking arm 87 fixed at one end to the free end of the solenoid piston and hinged at its other end to an end of the jaw shaft 88. A channeled guide base 98 mounts the solenoid cylinder between its channel-forming walls, and the solenoid piston and the shaft 88 pass between the walls. A captive cam slot 89a is cut into each channel wall, and a pin 88a fixed to the shaft 88 seats in the cam slot 89a in each wall. The restraining jaw 84 is on the end of the shaft 88; the pin 88a projects laterally from the both sides of the shaft intermediate its ends.

The base 89 is mounted on the fixed table 38 adjacent the wedge actuator 26 to project the jaw 84 over the guide fence 40 at the final position 25 of a block 18a. Each cam slot 89a has a horizontal section at its end removed from the fence 40 and from which an inclined section rises with a ramp-like configuration to the slot end proximal to the guide.

With this construction of the actuator 86, when the solenoid retracts the piston, drawing it toward the guide fence 40, as shown in FIGS. 3 and 7 and with dashed lines in FIG. 5, the piston and the arm 87 extend the shaft out from the base 89 and further across the fence 40. This moves the cam-follower pin 88a up the inclined section of the cam slot and thereby tilts the shaft upward, raising the jaw 84 up free of the block 18a on the table 22. The control unit 48 normally maintains the actuator 86 in this non-restraining position, where the restraining mechanism does not interfere with the slicing of each block.

However, when the feed mechanism 16 senses that the block residue 90 is too thin to cut another slice from it, or is thinner than whatever other thickness is desired, the control unit 48 (FIG. 1) operates the actuator 86 to retract the jaw 84, thereby clamping the block residue against the fence. The control unit provides this operation when the reciprocating table 22 is at the final position 25 (FIG. 2). To retract the jaw 84, the control unit actuates the solenoid 85 to extend the piston and arm 87, thereby drawing the shaft 88 into the base 89. As the cam-follower pin 88a moves down the inclined section of the cam slot to the horizontal section, the slot cams the shaft downward as shown in solid lines in FIG. 5. This drops the jaw 84 down to be alongside the block residue 90. The further movement of the shaft, with the pin in the horizontal slot section, draws the jaw 84 against the block residue (FIG. 4) until the jaw is clamping the residue, and the last slice cut, against the fence 40. Thereafter, the illustrated control unit operates the block-clamping cylinder 54 to retract the piston 52 and jaw 50, as shown in FIG. 6, and operates the cylinder 44 to return the table 22 to the initial position. The control unit then returns the actuator 86 to its non-restraining position. The block residue 90 is then adjacent the last slice 30 cut from the block and can be removed from the slicer.

The feed mechanism 16 senses when the uncut portion of a block is too thin to cut further slices from it by means of a switch which the clamping jaw 50 actuates. By way of example, and with reference to FIGS. 3–7, the illustrated feed mechanism 16 mounts a switch 92 having a control arm 94 above the block 18a being cut and adjacent the block clamping jaw 50 when at the final position 25. A switch actuator 96 is mounted on the top of the block clamping jaw 50 to engage the switch when the jaw is clamping a block 18 of the specified minimum thickness.

With this arrangement, the control unit 48 maintains the restraining mechanism 32 in the non-restraining condition (FIG. 3) so long as the jaw 50 is clamping a block 18a having a thickness greater than the specified minimum value. However, during the slicing of the block to this or to a lesser thickness, the jaw 50 carries the switch actuator 96 into engagement with the arm 94 of the switch 92, which signals the control unit to retract the jaw actuator 86 to the position of FIG. 4.

Actuation of switch 92 also inhibits operation of the wedge 24. Where desired, as for timing purposes, instead of the single switch 92, two switches arranged to be actuated in succession can be used. The first switch to be actuated can inhibit operation of the wedge actuator 26, and the other switch can operate the restraining mechanism 32.

With reference to FIGS. 3, 6 and 7, the slicer 10 base 36 has a discharge chute 102 leading downward from beyond the final position of the reciprocating table 22 to guide the block residues 90 from the machine. As shown in FIG. 7, each slice 30 is discharged from the slicer to a conveyor or other output device by the advancing movement of the next succeeding slice being cut. Similarly, the advancing movement of a fresh block on the table 22 pushes the residue 90 of the prior block down the chute 102.

In the event the residue 90 sticks to the last slice cut from it, as that slice is pushed from the machine, particularly after that slice and the residue have been together clamped to the fence by the restraining jaw 84, the residue 90 engages a separator 106 that separates it from the slice and deflects it to the chute 102. As shown in FIGS. 3, 6 and 7, a bracket 108 mounts the separator beyond the final position of table 22 and above the path of a block residue in moving from the final position to the chute 102.

The illustrated separator is a rake-like device that deflects the residue 90 to the side away from the slice. More particularly, the separator 106 has a number of resilient, deflecting tines 109 depending from a mounting block 110 to project their lower free ends into the path of the block residue 90. As shown in FIGS. 6 and 7, the tines are aligned in a row that extends both longitudinal to the fence 40 and flared outward from it, the flare being such as to deflect the residue 90 sideways away from the slice 30.

As a slice 30 to which a block residue 90 is stuck is pushed from the slicer, the residue carried with the block engages a tine 109. As the advancing residue increasingly deflects the tine, the reaction force of the tine dislodges the residue from the slice. The slice is then free to discharge alone, and the rake of tines 109 ensures that the residue 90 slides down the chute 102. The one or two lead tines, i.e., the tines closest to the saw blade 14, may engage the slice 30 before a further tine engages the block residue. However, the tines are sufficiently supple to deflect and allow the slice to pass beneath them.

Alternative to the illustrated separator 106 that, in effect, wedges the block residue from the last slice cut from it, the slicer 10 can use a wedging separator similar to the wedge 24 and actuator 26. In fact, these elements 24 and 26 can provide the separating function provided they are actuated after the restraining mechanism 32 has released the residue and after the table 22 has retracted from the final position.

Figure 8:
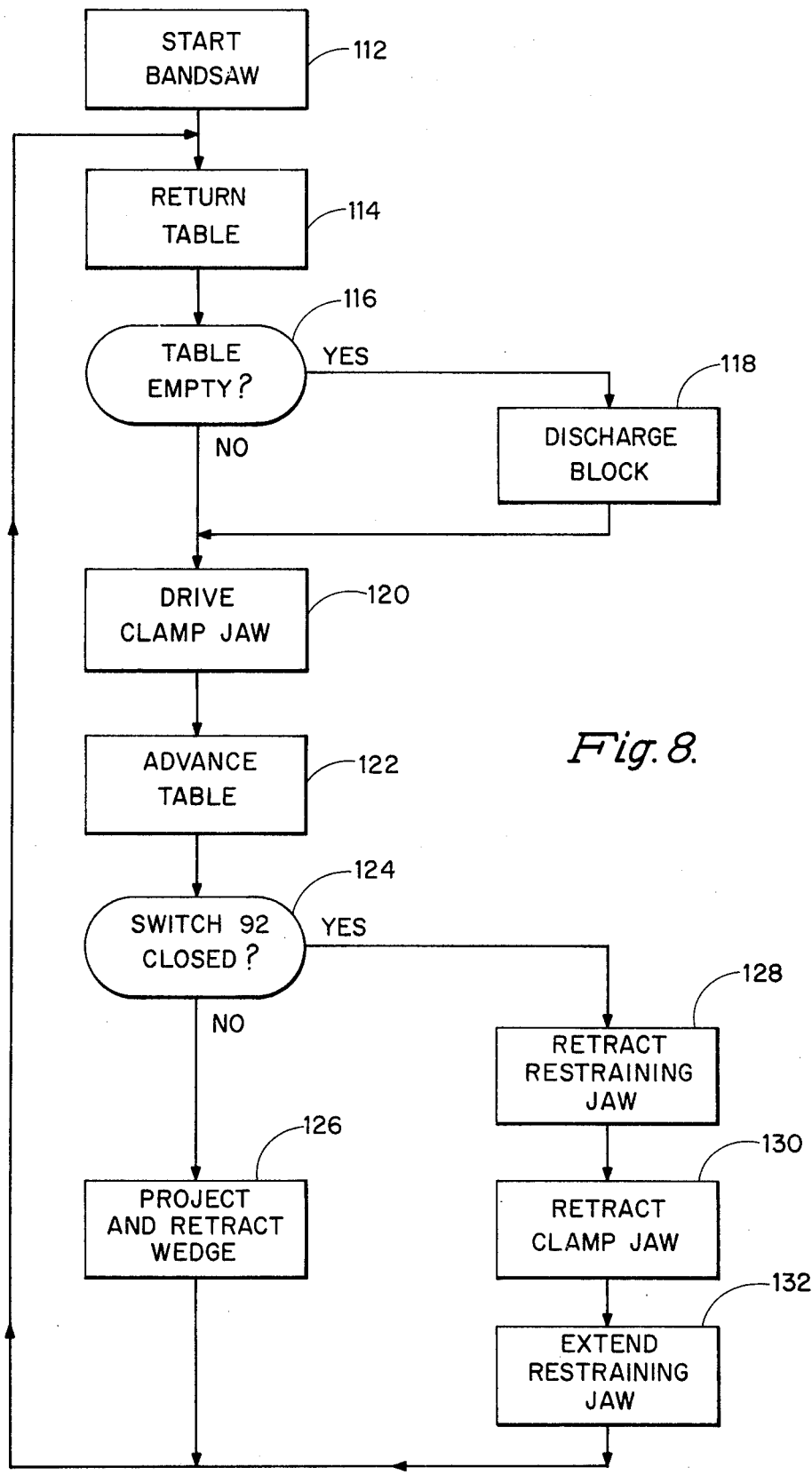
FIG. 8 is a flow chart of the operation of the machine of FIG. 1.

FIG. 8 is a flow chart summarizing the operation of the illustrated slicer 10. The operation starts with the start of the band saw, action box 112; the operator can stop the operation at any time in the sequence by means of a manual control, i.e., an on-off switch. As indicated with action box 114 of the flow chart, the illustrated sequence commences with the return of the reciprocating table 22 to the initial position 23 (FIG. 2) by retraction of the piston 46 into the pneumatic cylinder 44.

When no block is on the table 22, as indicated with an affirmative decision from decision box 116, the control unit 48 branches to action box 118. The "table empty" decision of box 116 can be made manually when the slicer is turned on after being off, and thereafter can be made automatically in response to the actuation, in the immediately preceding slice-cutting cycle, of the residue restraining mechanism 32 as noted below. In any event, when the control unit branches to action box 118, it operates the store and discharge mechanism 56 to discharge a fresh block 18 from the stack 20 onto the reciprocating table 22. This is done by actuating cylinder 66 of the mechanism 56 to project the piston 70 and thereby push the pusher jaw 68 across the platform 60 to discharge the bottommost block from the stack 20. The cylinder 66 automatically thereafter again retracts the piston 70 to withdraw the jaw 68 from the enclosure 58 and thereby allow the stack of blocks to descend and dispose another block on the platform 60 ready for discharge.

Upon completion of the block discharge operation, or when a block already is on the table (negative decision from box 116), the control unit proceeds to action box 120, and drives the clamp jaw. This is done by actuating cylinder 54 to extend piston 52, which carries the clamp jaw 50, and thereby clamp the block on the table against the fence 40. As indicated with action box 122, the control unit then advances the reciprocating table 22 from the initial position 23 to the final position 25, for the cutting of a slice from the block of material clamped on the table. As described above, the pressure in the clamping cylinder 54 gradually bleeds off during the table advance movement of action box 122, so that it is near zero when the table reaches the final position.

When the block is thick enough to cut another slice from it, as signalled by the switch 92 being not closed (negative decision from box 124), at the end of the block advancing motion the control unit 48 operates the wedge actuator 26 and projects the wedge 24 into the saw cut just made and then retracts it, action box 126. This displaces the uncut portion of the block 18a away from the fence 40 to ensure clearance between the block and saw blade. The slicer is then ready to commence the next cycle of operation, action box 114, to which it automatically proceeds.

However, when the switch 92 is closed, as indicated with an affirmative decision from the decision box 124, the control unit 48 inhibits the actions in box 126 and instead branches to the action indicated in action box 128. That is, it operates the actuator 86 to retract the restraining jaw 84 and thereby restrain the residue 90 of the block being cut against the fence. The control unit next retracts the clamp jaw 50, as indicated with action box 130, thereby readying the feed mechanism 16 for the discharge of another block 18 from the stack 20 onto the table 22 and signalling the control unit to produce an affirmative decision during the "table empty" decision in the next cycle. Thereafter, the control unit extends the restraining jaw 86, action box 132, thereby placing it in the non-restraining position shown in FIG. 3. The slicer then recycles to action box 114.

The control unit 48 for operating the pneumatic piston-cylinder actuators, or whatever other actuators are used, for this operation is considered conventional and is not discussed in detail since it can be fabricated with known skills. Further, it is to be understood that the control unit 48 operates in connection with a pneumatic pressure source, and with pressure regulators, limit switches, position sensors and the like, all as conventional. For example, as shown in FIG. 2, the block 18a when clamped against the fence 40 engages a position sensor 134 to signal the control unit to initiate each advance of the carriage 22.

With further reference to FIG. 1, it shows another feature of the automatic slicer 10. A principle feature of the slicer 10 is that it yields economies in time, labor and material being sliced, when contrasted with prior machines and practices. However, it has been found that a further economy results when the feed mechanism 16 quickly stops in the event the band saw blade 14 breaks. Continued operation of the feed mechanism after the blade breaks, even briefly before an attendant can respond and manually turn off the slicer, often results in wasteful damage to the block 18a on the table 22, as well as delaying restart of the slicer.

Accordingly, the slicer 10 has a sensor that responds to a loss of blade tension to deactivate the feed mechanism 16. As shown in FIG. 1, it is conventional that band saws have a strong spring 136 or like mechanism which resiliently urges the two pulleys on which the saw blade 14 is trained apart, to maintain the blade under tension. In the illustrated slicer band saw 12, the base 36 mounts the lower blade-guiding pulley and has a slide track 138 that telescopically receives a rail 140 mounted on a tube support 141 which carries the saw head 142, to which the upper blade-guiding pulley is mounted. The spring 136 is compressed between the base 36 and the saw head 142 by a follower 144 engaging a base-mounted tensioning cam 146 that is rotated by a ratcheted lever 148.

The weight of the tube support 141 and of the saw head 142, and the tension in the saw blade 14, all act on and hence compress the spring 136. Accordingly, when the blade 14 is intact, the spring is compressed as shown and the follower 144 is telescopically received well within the tube support 141. However, when the saw blade breaks, the spring is under less compression and expands, moving the tube support upward relative to the follower.

In accordance with the invention, a switch 150 is mounted on the lower end of the tube support, and a switch-actuating arm 152 is fixed to the follower 144 to engage and close the switch when the spring 136 is compressed. When closed, the switch 150 maintains a valve 156 (FIG. 1, upper left) positioned to deliver pneumatic pressure from the supply 158 to the control unit 48. However, when the switch is opened, it actuates the valve 156 to block off the pressure from the supply and instead to vent the pressure line feeding the control unit.

With this arrangement, when the blade breaks or otherwise loses tension so that the saw head and tube support rise, the tube support lifts the switch 150 relative to the actuator arm 152 and thereby opens the switch 150. This action promptly removes the pneumatic pressure from the control unit 48, and hence from all the pneumatic cylinders and actuators of the slicer 10. Consequently, the slicer feed mechanism halts. Where desired, the switch 150 can also interrupt the electric power to the slicer 10, for example to deactivate the saw motor, when the blade breaks.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It should be noted that the slices cut with the machine described above can be of sufficient thickness to be considered "slabs;" and accordingly the term "slice" is used herein in a broad general sense.

It is also to be understood that the following claims are intended to cover all of the generic and specific features of the invention herein described, and all statements of the scope of the invention which as a matter of language might be said to fall therebetween.

Having described the invention, what is claimed as new and secured by Letters Patent is:

1. In apparatus for feeding a unit of material to a saw tool repeatedly for the cutting of slices from the unit, and wherein unit-transporting feed means advances relative to the saw tool for each slice-cutting operation between a start position where the saw tool is at one side of the unit to a finish position where the saw tool is beyond the other side of the unit to cut a slice from the unit, and then retracts back to the start position with the saw tool passing between the slice just cut and the uncut portion of the unit, the improvement wherein
   A. said feed means clamps the unit being cut between clamp members spaced apart along the direction
      (i) which is transverse to the direction of movement between said start and finish positions and
      (ii) along which the thickness of the slice cut from the unit with each cutting operation is measured,
   B. deflecting means introduces a wedge member into the cut just made between a slice and the uncut portion of the unit in the time between said relative movement of said saw tool beyond the unit toward said finish position and the start of said retraction movement, said wedge member displacing the uncut portion of said unit away from the slice just cut for the passage of the saw tool therebetween without interference by said unit during said retract motion, and
   C. said deflecting means maintains said wedge member free of the unit being cut during said advance movement of said feed means.

2. In apparatus as defined in claim 1, the further improvement wherein said feed means urges said clamp members together with a force that has a unit-clamping value during said advance movement of said saw tool throughout cutting engagement with said unit and that has a near-zero value when said deflecting means introduces said wedge member into the cut just made.

3. In apparatus as defined in claim 1, the further improvement wherein
   A. said feed means has a first of said clamp members fixed relative to a second of said clamp members,
   B. said feed means urges said second clamp member toward said first clamp member with a force having a maximum value when said feed means is at said start position and which decreases during said advancing movement toward said finish position to attain a near-zero value when said saw tool has moved relative to said unit completely through a slice-cutting engagement with said unit.

4. In apparatus for feeding a block of material to a band saw blade repeatedly for the cutting of slices from the block, and wherein block-transporting feed means advances the block from a start position where the saw blade is at a first side of the block to a finish position where the saw blade is beyond the opposite, second, side of the block, thereby to cut a slice from the block, and then retracts the block back to said start portion with the saw blade passing through the cut just made, the improvement comprising
   A. a wedging member mounted with the frame which carries said saw blade and for movement between a retracted position and an extended position, for projecting when in said extended position into the cut just made between a slice and the remaining portion of the block thereby to widen the cut, and for withdrawal from the block and slice and the cut therebetween when in said retracted position, and
   B. actuating means for moving said wedging member normally into said retracted position, and from said retracted position to said extended position in the time between the advance of the block through a slice-cutting engagement with the saw blade and the retraction of the block to said start position.

5. In apparatus as defined in claim 4, the further improvement wherein
   A. said feed means clamps the block being cut between a first fixed clamp member against which the block segment being sliced from the block abuts and a second clamp member movable relative to said fixed clamp member, and
   B. said wedge member moves the uncut portion of the block away from said fixed first clamp member upon being introduced into said cut to effect said enlargement of the width of said cut.

6. In apparatus as defined in claim 4, the further improvement wherein
   A. restraining means moves from a non-restraining position out of engagement with a block being cut to a restraining position where it restrains the uncut portion of the block being cut at the finish position in response to the thickness of the uncut portion of the block being cut being less than a preselected value, and
   B. said actuating means maintains said wedge member retracted free of the block being cut during disposition of said restraining means in said restraining position.

7. Apparatus for automatically feeding blocks of material in serial succession to a cutting tool which automatically repeatedly cuts segments from each block, said apparatus comprising
   A. releasable block-feeding means
      1. having a release position for releasing and for receiving a block and having a closed position for holding the block positioned for said cutting of segments therefrom,
      2. clamping the block being cut, when in said closed position, between clamp members spaced apart along the direction (i) which is transverse to the direction of relative movement between said start and finish positions and along which the thickness of the segment cut from the block with each cutting operation is measured,
      3. advancing relative to said cutting tool for each segment-cutting operation between a start position where the cutting tool is at one side of the block to a finish position where the saw tool is beyond the other side of the block to cut a segment from the block, and subsequently retracting back to the start position with the saw tool passing through the cut just completed, B. block store and discharge means for storing said blocks and operable to discharge a single block to said block-feeding means, C. block-displacing means
  1. having a wedge member,
  2. operable to introduce said wedge member into a cut just made between a segment and the uncut portion of a block in the time between said relative movement of said cutting tool beyond the block toward said finish position and said retraction movement of said cutting tool back into the cut just completed, said wedge member displacing the uncut portion of said block away from the segment for passage of the saw tool therebetween without interference during said retract motion, and
  3. maintaining said wedge member free of the block being cut during the advance movement of said feeding means, D. means sensing the thickness of the block being cut, E. means for restraining the uncut portion of the block being cut at said finish location when the thickness thereof is less than a preselected value, and F. control means
  1. inhibiting said wedge introducing operation of said block-displaying means when the thickness of the block being cut is less than said preselected value, and
  2. maintaining said feeding means in said closed position during each advance movement, and moving said feeding means from said closed position to said release position when the thickness of the block being cut is less than said preselected value, and
  3. actuating said store and discharge means to discharge a block therefrom to said feeding means when said feeding means is in said release position and is concurrently in said start position.

8. In apparatus for feeding a block of material to a cutting tool repeatedly for the cutting of successive slice-like segments from the block and wherein block-transporting feed means moves relative to the cutting tool for each segment-cutting operation from a start position where the tool is at a first side of the block to a finish position where the tool is at the opposite second side of the block to cut a segment from the block, and subsequently retracts back to said start position, the improvement comprising
  A. first means sensing the thickness of the uncut portion of the block, and
  B. second means responsive to said first means for restraining the uncut portion of the block at said finish location only when the thickness thereof is less than a preselected value.

9. In apparatus as defined in claim 8, the further improvement wherein
  A. said feed means
    1. moves along a first direction between said start and finish positions, and
    2. clamps the block being cut between two clamp members spaced apart along a second direction
      (i) which is transverse to said first direction and
      (ii) along which the thickness of the segment cut from the block with each cutting operation is measured, and moves one clamp member relative to the other along said second direction between block-releasing and block-clamping positions, and
  B. sequencing means
    1. moves said clamp members to said clamp position thereof when said feed means is in said start position,
    2. moves said feed means from said start position toward said finish position with said clamp members clamping a block therebetween throughout cutting engagement of said tool with the block,
    3. responds to the sensing of a block thickness less than said preselected value, by said first means, successively to restrain the uncut portion of the block being cut at said finish location, to move said one clamp member relative to the other clamp member to said block-releasing position and to retract said feed means to said start location.

10. In apparatus as defined in claim 8, the further improvement comprising wedge means for interposing into the cut between a segment and the uncut portion of the block, subsequent to said restraining thereof at said finish location, for separating said segment and said block portion from each other.

11. In apparatus as defined in claim 10, the further improvement wherein
  A. said wedge means engages the cut between a segment and said block portion from the direction in which feed means moves said block of material relative to said cutting tool, and
  B. said wedge means comprises plural separating elements, each for interposing into said cut and disposed at different locations successively spaced along the direction in which said thickness is sensed.

12. In apparatus as defined in claim 11, the further improvement wherein each separating element is resiliently deflectable along said direction of relative block movement.

13. In apparatus as defined in claim 9,
  A. the further improvement comprising wedge means for interposing into the cut between the segment just cut and the uncut portion of the block, and
  B. wherein said sequencing means engages said wedge means with said segment and block portion subsequent to the retraction of said feed means from said finish location toward said start location.

14. In apparatus as defined in claim 8, the further improvement comprising resiliently acting deflecting means for engagement with the uncut portion of the block subsequent to said restraining thereof at said finish location, and for deflecting said portion away from the last segment cut therefrom to prevent said segment from being discharged from said apparatus together with said portion.

* * * * *

UNITED STATES PATENT OFFICE
CERTIFICATE OF CORRECTION

Patent No. 3,736,829      Dated June 5, 1973

Inventor(s) Mario J. Pedi

It is certified that error appears in the above-identified patent and that said Letters Patent are hereby corrected as shown below:

Column 4, line 13, change "clock" to --block--.

Column 6, line 57, "98" should be --89--.

Column 12, line 2, change "portion" to --position--.

Column 12, line 57, insert --(ii)-- before "along".

Signed and sealed this 6th day of August 1974.

(SEAL)
Attest:

McCOY M. GIBSON, JR.
Attesting Officer

C. MARSHALL DANN
Commissioner of Patents